United States Patent [19]

Ryan

[11] Patent Number: 4,643,159

[45] Date of Patent: Feb. 17, 1987

[54] AUTOMATIC CAMERA ACTUATING APPARATUS FOR AN ARCHERY BOW

[76] Inventor: Lawrence W. Ryan, 1404 Horse & Buggy Dr., Adel, Iowa 50003

[21] Appl. No.: 784,772

[22] Filed: Oct. 7, 1985

[51] Int. Cl.$^4$ .......... F41B 5/00; G03B 29/00; G03B 17/38; G03B 17/00

[52] U.S. Cl. .................. 124/24 R; 124/88; 354/75; 354/76; 354/269; 354/293

[58] Field of Search ............ 124/23 R, 24 R, 87, 124/88, 41 A, DIG. 1, 86, 90; 354/75, 76, 266, 269

[56] References Cited

U.S. PATENT DOCUMENTS

| | | | |
|---|---|---|---|
| 1,861,243 | 5/1932 | Rothman et al. | 354/75 |
| 3,062,114 | 11/1962 | Palos | 354/76 |
| 3,240,135 | 3/1966 | Oswald | 354/76 |
| 3,288,988 | 11/1966 | Boggs | 124/23 R |
| 3,450,122 | 6/1969 | Diamond | 124/90 |
| 3,537,440 | 11/1970 | Izuta | 124/24 R |
| 3,623,468 | 11/1971 | Crest | 124/24 R |
| 4,296,725 | 10/1981 | Broderick | 124/24 R |

Primary Examiner—Richard C. Pinkham
Assistant Examiner—Gary Jackson
Attorney, Agent, or Firm—Henderson & Sturm

[57] ABSTRACT

An attachment for an archery bow including a camera having a shutter and a shutter control mechanism for opening and closing the shutter is attached to the bow and a mechanism is provided for actuating the shutter control mechanism in response to the shooting of an arrow from the bow.

8 Claims, 23 Drawing Figures

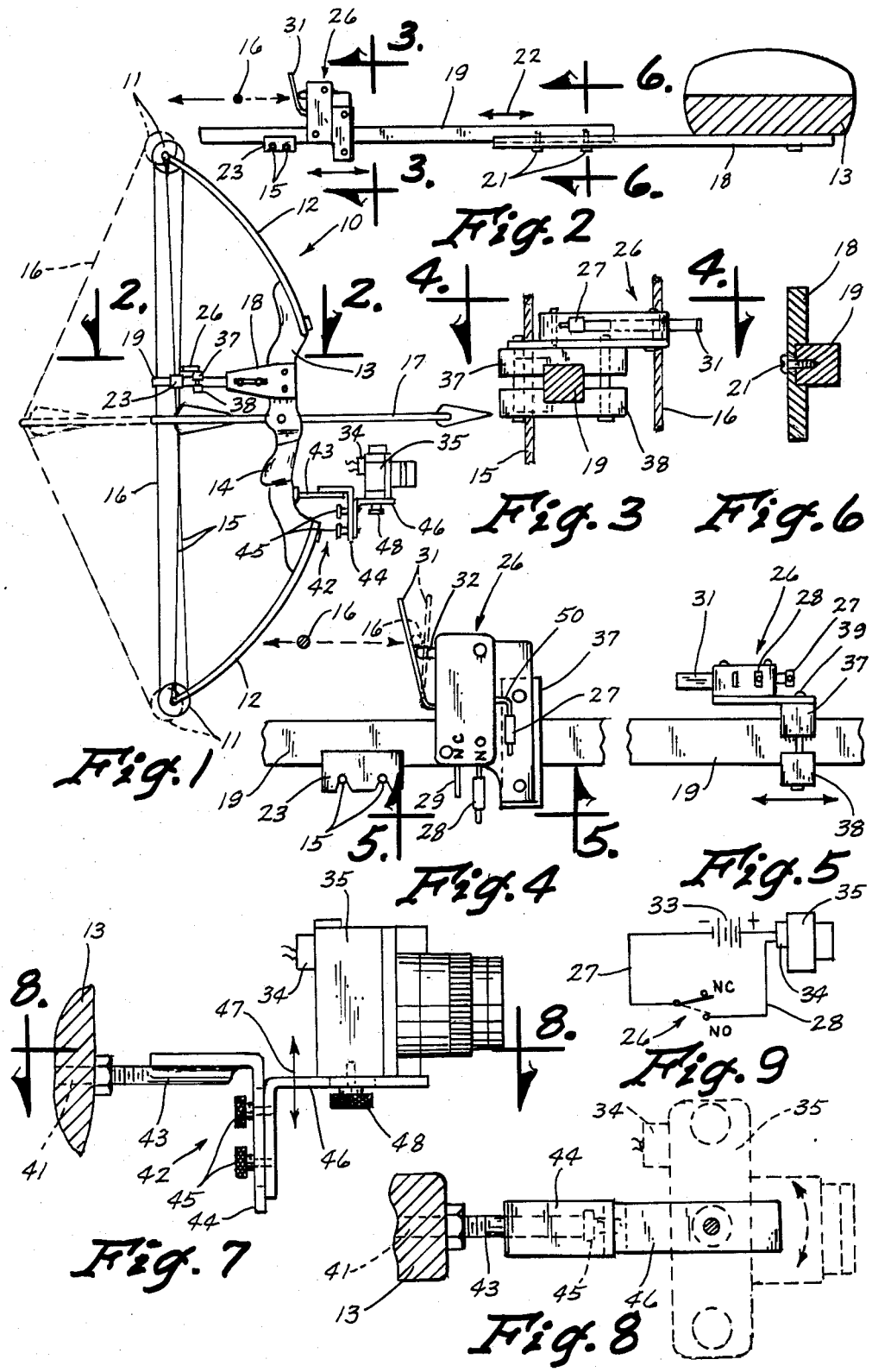

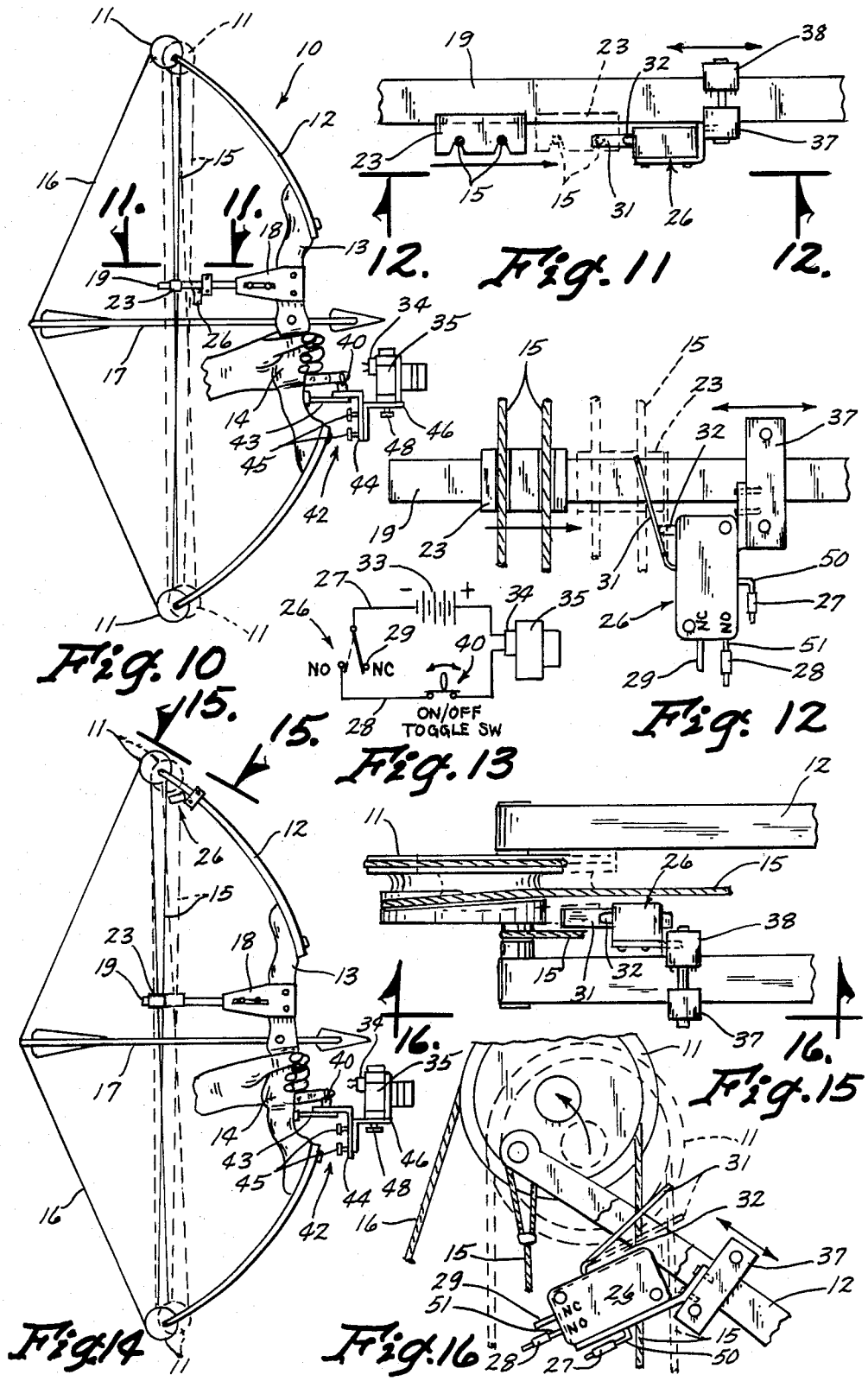

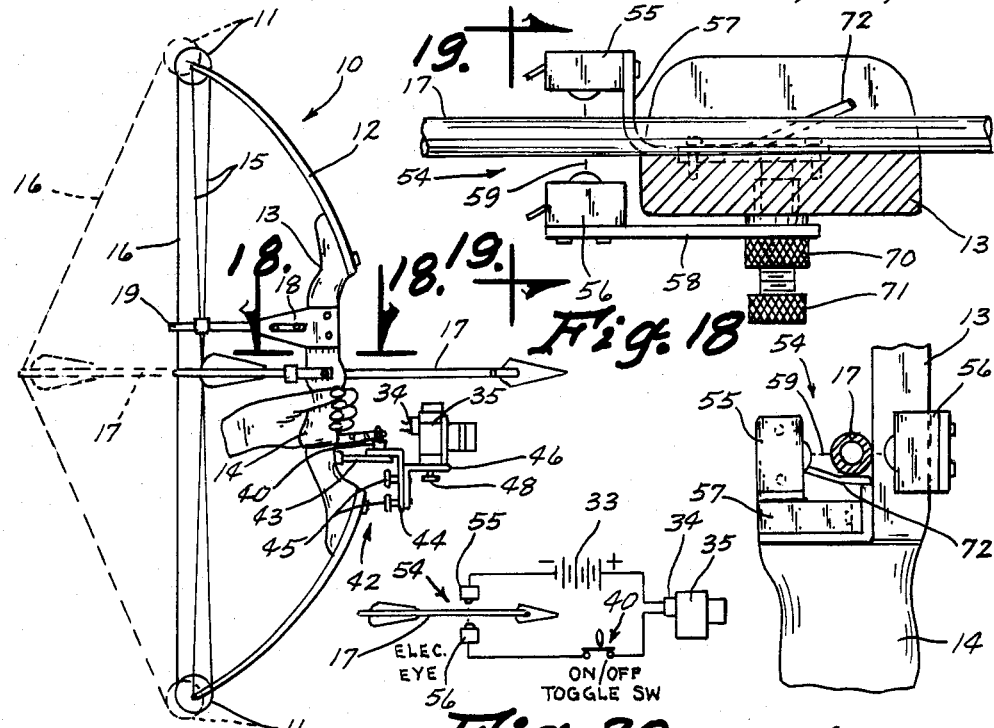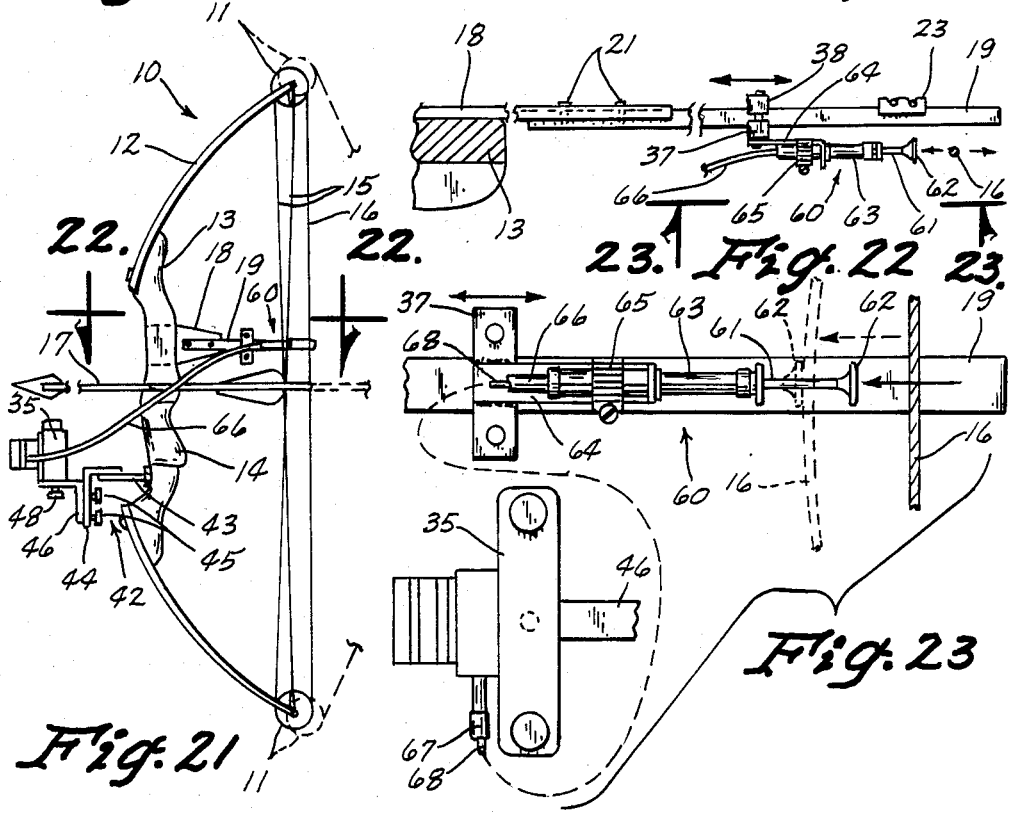

AUTOMATIC CAMERA ACTUATING APPARATUS FOR AN ARCHERY BOW

TECHNICAL FIELD

The present invention relates generally to the field of archery, and more particularly to an automatic camera actuating attachment for an archery bow.

BACKGROUND ART

When hunting with a bow and arrow, it is common for such an archer to want to take photographs of the game encountered, but because the shooting of a bow and arrow requires the utmost concentration in order to effect an accurate shot, it is generally considered to be impossible to take pictures while shooting a bow and arrow. Consequently, if the game to be pursued while hunting with a bow and arrow is also to be photographed, then a separate photographer must normally be present. Furthermore, when such photographer is present, the movement of the photographer and shutter noise of the camera occurring prior to the archer's shot will quite often frighten the game and make it impossible for the archer to get a good shot at such game.

U.S. Pat. No. 4,296,725 shows a camera attached to a bow and arrow and it proposes to have a hunting archer push a plunger to mechanically actuate a camera at the same time that an arrow is shot from the bow. There are two major problems with this approach. Firstly, it is generally impossible to shoot a bow accurately while at the same time pushing a button to actuate a camera. Secondly, it is extremely difficult to coordinate the timing of actuating the camera with executing the shot from the bow. If the camera shutter makes a noise prior to the arrow leaving the bow, the game will be gone before the arrow reaches its destination. On the other hand, if the camera is actuated too late, then the game will not be photographed until after it is startled by the shot.

Consequently, there is a need for an apparatus for actuating a camera at the precise moment that an arrow is shot from a bow.

DISCLOSURE OF THE INVENTION

The present invention relates generally to an attachment for an archery bow. A camera having a shutter and a shutter control mechanism for opening and closing the shutter is attached to the bow and a mechanism is provided for actuating the shutter control mechanism in response to the shooting of an arrow from the bow.

An object of the present invention is to provide an apparatus for attachment to a bow which will take a photograph automatically in response to the shooting of an arrow from such bow.

Another object of the present invention is to provide an apparatus of the aforementioned type which uses the string of the bow to ultimately actuate the camera.

Another object of the present invention is to utilize an apparatus of the aforementioned type which utilizes the cams of a compound bow to ultimately actuate the camera.

Another object of the present invention is to use the cables from a compound bow to ultimately actuate camera of the aforementioned apparatus.

Another object of the present invention is to utilize an electric eye to actuate a camera upon the shooting of an arrow from an archery bow.

Other objects, advantages, and novel features of the present invention will become apparent from the following detailed description of the invention when considered in conjunction with the accompanying drawings.

BRIEF DESCRIPTION OF THE DRAWINGS

FIG. 1 shows an archery bow of a compound type having a preferred embodiment of the present invention attached thereto;

FIG. 2 is an enlarged cross sectional view taken along line 2—2 of FIG. 1;

FIG. 3 is an enlarged cross sectional view taken along line 3—3 of FIG. 2;

FIG. 4 is a view taken along line 4—4 of FIG. 3;

FIG. 5 is a view taken along line 5—5 of FIG. 4;

FIG. 6 is a cross sectional view taken along line 6—6 of FIG. 2;

FIG. 7 is an enlarged side elevational view of a camera and a camera mounting apparatus as shown in FIG. 1;

FIG. 8 is an enlarged partial cross sectional view taken along line 8—8 of FIG. 7;

FIG. 9 is a schematic view of the circuit switch and electronically controlled shutter type camera for the preferred embodiment of FIGS. 1-8;

FIG. 10 is a second embodiment of the present invention showing a compound bow with a camera attached to the front thereof which is electronically actuated;

FIG. 11 is a cross sectional view taken along line 11—11 of FIG. 10;

FIG. 12 is an enlarged view taken along line 12—12 of FIG. 11;

FIG. 13 is a schematic of the electrical circuit of the embodiments shown in FIGS. 10-16;

FIG. 14 is a third one of the preferred embodiments disclosed herein connected to a compound bow;

FIG. 15 is an enlarged partial view taken along line 15—15 of FIG. 14;

FIG. 16 is an enlarged view taken along line 16—16 of FIG. 15;

FIG. 17 shows a fourth one of the preferred embodiments of the present invention;

FIG. 18 is an enlarged partial cross sectional view taken along line 18—18 of FIG. 17;

FIG. 19 is a cross sectional view taken along line 19—19 of FIG. 18;

FIG. 20 is a schematic view of the electrical system of the embodiment of FIGS. 17-19;

FIG. 21 is a side elevational view of a fifth one of the preferred embodiments of the present invnention;

FIG. 22 is an enlarged partial cross sectional view taken along line 22—22 of FIG. 21; and FIG. 23 is an enlarged side view taken along line 23—23 of FIG. 22.

BEST MODE FOR CARRYING OUT THE INVENTION

Referring now to the drawings, wherein like reference numerals designate identical or corresponding parts throughout the several views, FIG. 1 shows a compound bow (10) of a type having eccentrically mounted cams (11) attached to each end of flexible limbs (12), it being understood that the present invention is useful on other types of bows as well, such as on long bows or recurve bows. The flexible limbs (12) are attached at the inner ends thereof to a riser (13) having a handle (14) attached thereto as is conventional in this art. Cables (15) extend over and around the eccentrically mounted cams (11) and are attached at the end thereof to a bow string (16). The bow (10) is shown with an arrow (17) disposed thereon in readiness to be shot therefrom.

Referring to FIG. 2, it is noted that a cable guard bracket (18) is adjustably mounted to a cable guard bar (19) and has a pair of threaded fasteners (21) attaching the members (18 and 19) together so that the member (19) can move and be adjustably positioned along the arrow (22). A cable guard slide (23) of a conventional design has recesses therein for slidably receiving the cable (15) of the bow (10). A microswitch apparatus (26) is adjustably attached to the cable guard (19) as can readily be seen in FIGS. 2, 4 and 5.

The microswitch (21) is of a type which can be connected as either normally open or normally closed. As shown in FIG. 4, a common wire (27) is connected to the circuit shown in FIG. 9 on one side thereof and a second wire (28) is connected in the circuit on the other side of the circuit shown in FIG. 9. Nothing is connected to the normally closed connection (29) shown in FIG. 4. An actuating lever (31) on the microswitch (26) is pivotable from the position shown in solid lines in FIG. 4 to the position shown in dashed lines in FIG. 4. A button (32) disposed within the microswitch (26) is biased to an outward position corresponding to the position of the lever (31) shown in solid lines. When the switch is in this position, the microswitch (26) is normally open, for example, as shown in FIG. 9 in solid lines. When the lever (31) moves to the dashed line position shown in FIG. 4, then the microswitch (26) is closed and the circuit shown in FIG. 9 causes a complete circuit between the battery (33) and the electronic shutter control mechanism (34) to thereby actuate the camera (35).

Clamping blocks (37) and (38) having fasteners (39) disposed therethrough are utilized to adjustably position the microswitch (26) to the cable guard (19) to a position wherein it is a predetermined space from the bow string (16) for example, as shown in FIG. 4.

Referring to FIG. 7, it is noted that the riser (13) has a threaded opening (41) disposed therein and the camera (35) is adjustably attached to the riser (13) of the bow by an adjustable bracket (42), including a threaded member (43) welded to an L-shaped member (44). The L-shaped member (44) is threadably attached by threaded fasteners (45) to another L-shaped bracket (46). By loosening the fasteners (45) and moving the bracket (46) to a predetermined position with respect to the L-shaped member (44), the camera may be positioned upwardly or downwardly in the direction of the arrow (47). The camera (35) is then threadably attached to the L-shaped bracket (46) by a threaded fastener (48). The adjustments for the positioning the camera (35) shown in FIGS. 7 and 8, whereby the camera can be positioned upwardly or downwardly, or pivoted around the access of the fastener (48), permits the camera to be pointed in the same direction that the arrow (17) is pointed.

In operation of the embodiment shown in FIGS. 1-9, it is noted that an archer merely needs to pull back the compound bow (10) to the position shown in dashed lines in FIG. 1, and that will cause the string (16) to move backwardly accordingly. When the string (16) and arrow (17) are released by the archer in order to effect a shot therefrom, the string (16) will not stop at the position shown in solid lines in FIG. 1; because of inertia, the string (16) will move from the normal rest position shown in FIGS. 1 and 4 to the position shown in dashed lines in FIG. 4, thereby causing the normally open microswitch (26) to close momentarily, thereby actuating the shutter control mechanism (34) whereby the camera (35) will take a photograph.

Once the string hits the lever (31) to actuate the camera, it will then oscillate to a rest position back as shown in solid lines in FIG. 1. It will be appreciated that a picture can be taken from the camera (35) in this way without any thought of what needs to be done by the archer. In other words, the archer can be in a hunting situation or the like, and take a picture of the game being hunted wherein the camera will take a picture precisely at the instant that the arrow is shot from the bow. Alternatively, the camera could be actuated manually in a conventional manner while attached to the bow, if it is desired to take a picture without shooting the bow.

Referring now to FIG. 10, a second embodiment of the present invention is shown. The compound bow (10) which is shown is also of a conventional type, the same type as shown in FIG. 1, although it will be appreciated that other types of compound bows can be utilized in this preferred embodiment. Referring to FIGS. 11 and 12, it is noted that the microswitch (26) is connected into the circuit of FIG. 13 by connecting wire (27) to the common wire (50) of microswitch (26) and the other wire (28) is connected to the normally on lead (51) of microswitch (26) which is connected to the other side of the circuit shown in FIG. 13.

Referring to FIG. 13, it is noted that the microswitch (26) is normally open when the spring biased plunger (32) is not pushed in, corresponding to the lever (33) being in the position shown in solid lines in FIG. 12. This corresponds to the position of the switch (26) shown in solid lines in FIG. 13 as well. Also included in the circuit of FIG. 13 is a on-off toggle switch (40).

When it is desired to shoot the arrow (17) from the bow (10) of FIG. 10, and at the same time take a picture from camera (35), the following procedure is followed. First of all, it will be noted that when the bow has not been drawn, the cable slide (23) will be in the position shown in dashed lines in FIG. 12, and the lever (31) will be in the position shown in dashed lines in FIG. 12, and the switch (26) will then be in the closed position shown in dashed lines in FIG. 13. Because this switch (26) is closed in this position, the on-off toggle switch (40) must be opened (the off position), otherwise the camera (35) will be in electrical contact with the battery (33) when the bow is undrawn.

So when it is desired to shoot the arrow (17) and at the same time take a picture from camera (35), the bow string (16) and arrow (17) are drawn to the position shown in solid lines in FIG. 10 and that will cause the slide (23) to move from the position shown in dashed lines in FIG. 12 to the position shown in solid lines in FIG. 12. Once that has been done, then the on-off toggle switch (40) is closed (turned on), it being understood that at that time the microswitch (26) will be opened to the position shown in solid lines in FIGS. 12 and 13. Then when the archer releases the bow string (16) and the arrow (17) passes from the bow, the slide (23) will at the same time move forwardly to the position shown in dashed lines in FIG. 12, causing the lever (31) and button (32) to also move to the position shown in dashed lines and, correspondingly, the switch (26) will move to the position shown in dashed lines in FIG. 13, thereby causing a completed circuit between the battery (33) and the electronic shutter control (35) to thereby cause the camera to open and close the shutter to take and expose the film therein. After that has been done, then the switch (40) would be manually moved open again in readiness to repeat the process if another picture is to be taken at the same time that another arrow is to be shot.

Referring now to FIG. 14, it is noted that the compound bow (10) has a third one of the preferred embodiments attached thereto. It is noted by viewing FIGS. 15 and 16 that the clamping blocks (37 and 38) are utilized to clamp the microswitch (26) to the bow limb (12) in a predetermined position for contact with the eccentrically mounted cams (11). The microswitch (26) is connected into a circuit precisely the same way as that shown in FIG. 13. Consequently, the microswitch (26) is set up in a normally open position. When the bow (10) is at rest and undrawn, for example as shown in dashed lines in FIG. 14, the circular cams (11) are in the position shown in dashed lines in FIGS. 14–16. In this at rest position, the normally open microswitch (26) is closed, corresponding to the position shown in dashed lines in FIG. 13. Because the microswitch (26) is closed when the bow is at rest, it is necessary to open the on-off toggle switch (40) when the device is not being used so that the camera will not be electrically connected to the battery (33).

Once the it is desired to use the apparatus shown in FIG. 14 to shoot an arrow (17) while at the same time taking a photograph by using camera (35), the bow (10) first needs to be drawn to the position of the string (16) and arrow (17) as shown in FIG. 14. Once that has been done, then the lever (31) will move from the position shown in dashed lines in FIGS. 15 and 16 to the position shown in solid lines in FIGS. 15 and 16, and this will also correspond to the position shown in solid lines in the schematic of FIG. 13 wherein the microswitch (26) is open such that no electricity will flow therethrough in such position. At that time, then the little finger of the archer is utilized to close the on-off toggle switch (40). Then when the string (16) and arrow (17) are released so that the shot is made, the cams (11) will rotate quickly back to the position shown in dashed lines in FIGS. 14–16 and this will cause the microswitch (26) to close and make electrical contact and complete the circuit from the battery to the shutter control mechanism (34) thereby causing the shutter within the camera (35) to expose the film and take a picture of whatever the camera (35) is pointed towards.

Referring now to FIG. 17, it is noted that a conventional compound bow (10) is shown having a fourth one of the preferred embodiments of the present invention connected thereto. Referring to FIGS. 18–20, it is noted that an electric eye having a first side (55) and a second side (56) are adjustably mounted by brackets (57) and (58) to the bow handle or riser (13). The camera (35) having an electronic shutter control (34) is connected in a circuit with a battery (33) and an on-off switch (40). The electric eye (54) consisting of parts (55 and 56) is of a type wherein an electric circuit will be completed when a beam of light (59) as indicated by the dashed lines can pass from one of the members (55) to the other member (56). When this passage of light of a light beam (59) is interrupted, then the circuit is also interrupted. Consequently, the electric eye (54) is positioned so that the beam of light (59) extends across where the arrow (17) is on and arrow rest (60).

In order to utilize the apparatus shown in FIGS. 17–20, it is noted that in order to go from place to place with this device without having the battery (33) connected in the circuit electrically with the camera (35), the on-off toggle switch (40) will be opened so that electricity will not flow. Once the archer gets to a place where it is desired to utilize the present invention, an arrow (17) will be placed on the arrow rest (72) as shown in FIGS. 17–20. Once that has been done, then the on-off toggle switch (40) would be closed, but electricity will not flow through the circuit because of the fact that the light beam (59) is interrupted by the presence of the arrow (17) in its path. But once the arrow is drawn to the position shown in dashed lines in FIG. 17, and released or shot, there is nothing present to interrupt the light beam (59) between electric eye members (55 and 56) and the circuit will immediately be complete, thereby causing the electric shutter control (34) to open and close the shutter within the camera (35), thereby exposing the film therein, which will ultimately result in a photograph when processed.

Referring now to FIGS. 21–23, it will be noted that a fifth one of the preferred embodiments is shown connected to a typical compound bow (10). The embodiment shown in FIGS. 21–23 has the camera (35) mounted adjustably in the same manner as in the aforementioned embodiments, but the camera (35) is of a type wherein the shutter is mechanically tripped, rather than electrically actuated. A plunger assembly (60), having a rod (61) and an enlarged end (62) attached thereto, is slidably disposed within a housing (63). This assembly (60) is adjustably mounted to the cable guard (19) by members (37 and 38) which can be loosened and moved along the cable guard (19) and then tightened back down in whatever position is desired. Adjusting can also be accomplished by using fasteners (21) to move the position of the cable guard (19).

A bracket (64) holds the housing (63) and a hose clamp or the like (65) is utilized to hold the housing (63) tight against the bracket (64). A tube (66) having a cable therein extends downwardly to the camera (35) and has a connector (67) which fastens into the camera (35). When the plunger parts (61) and (62) are moved from the position shown in FIG. 23 in solid lines to the position shown in FIG. 23 in dashed lines, the cable (68) within the tubular member (66) will push an actuator mechanically within the camera (35) to cause the shutter to open and close as in a conventional camera shutter. The plunger parts (61) and (62) are mounted in a particular predetermined position with respect to the string (16) as shown in FIGS. 22 and 23 so that it is spaced from the string (16) in its initial undrawn position as shown in solid lines in FIGS. 22 and 23. When the bow (10) and arrow (17) are drawn to the position shown in dashed lines in FIG. 21, and then released, the bow string (16) will not stop at the position thereof shown in Fig. in solid lines in FIGS. 23 and 21, but will move beyond that position because of inertia to push the members (62 and 61) to the position shown in dashed lines in FIG. 23, thereby actuating the camera (35) at the same time that the arrow (17) is shot from the bow (10).

Accordingly, it will be appreciated that the preferred embodiments disclosed herein do indeed accomplish all of the aforementioned objects. Obviously, many modifications and variations of the present invention are possible in light of the above teachings. It is therefore to be understood, that within the scope of the appended claims, the invention may be practised otherwise than as specifically described.

I claim:

1. An archery apparatus comprising:
an archery bow having a bowstring for use in shooting arrows;
a camera having a shutter and shutter control means for opening and closing said shutter;
means for attaching said camera to an archery bow; and
means for actuating said shutter control means in response to release of the bowstring and thereby the shooting of an arrow from said bow.

2. The apparatus of claim 1 wherein said actuating means comprises electric eye means in alignment with an arrow disposed on said bow in readiness to be shot therefrom for sending an electric signal to said shutter control means when said arrow passes beyond said electric eye means.

3. The apparatus of claim 1 wherein said shutter control means is electronic and said actuating means comprises a microswitch means operatively attached to said bow, said microswitch means having an actuating lever thereon.

4. The apparatus of claim 3 wherein said microswitch is normally open and contact of said string with said actuating lever of said microswitch means causes said microswitch means to close a circuit to cause actuation of said shutter control means.

5. The apparatus of claim 3 wherein said bow is a compound bow having eccentrically mounted cams thereon, cables passing over said cams, said cables being attached to said bow string and a cable guard for holding said cables away from an arrow being shot from said bow.

6. The apparatus of claim 5 wherein said microswitch means is normally open and is mounted on said cable guard wherein said cable will operatively be ultimately in contact with and out of contact with said actuating lever when an arrow is shot from said bow to thereby respectively open and close said microswitch means.

7. The apparatus of claim 5 wherein said microswitch means is normally open and is attached to said bow adjacent to one of said cams whereby said actuating lever is alternatively in contact with or out of contact with said one cam when an arrow is shot from said bow to thereby respectvely open and close said microswitch means.

8. The apparatus of claim 1 wherein said actuating means comprises plunger means for contacting the string when the bow is shot, a cable connected to one end of said plunger means and the other end of said cable being operatively attached to a mechanical shutter control button on said camera whereby when an arrow is shot form the bow, the bow string will push the plunger means causing the cable to depress the mechanical shutter control button.

* * * * *